(12) United States Patent
Grieser et al.

(10) Patent No.: US 12,479,420 B2
(45) Date of Patent: Nov. 25, 2025

(54) METHOD AND SYSTEM FOR OPTIMIZING A DETECTED PARKING SPACE

(71) Applicant: Continental Autonomous Mobility Germany GmbH, Ingolstadt (DE)

(72) Inventors: Jochen Grieser, Bruchköbel Roßdorf (DE); Martin Buczko, Griesheim (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 50 days.

(21) Appl. No.: 18/555,730

(22) PCT Filed: Apr. 5, 2022

(86) PCT No.: PCT/DE2022/200062
§ 371 (c)(1),
(2) Date: Oct. 17, 2023

(87) PCT Pub. No.: WO2022/223083
PCT Pub. Date: Oct. 27, 2022

(65) Prior Publication Data
US 2024/0199004 A1    Jun. 20, 2024

(30) Foreign Application Priority Data
Apr. 19, 2021    (DE) .................... 10 2021 203 825.5

(51) Int. Cl.
*B60W 30/06*    (2006.01)
*G06V 10/24*    (2022.01)
(Continued)

(52) U.S. Cl.
CPC .......... *B60W 30/06* (2013.01); *G06V 10/242* (2022.01); *G06V 10/44* (2022.01); *G06V 20/586* (2022.01); *B60W 2420/403* (2013.01)

(58) Field of Classification Search
CPC ............ B60W 30/06; B60W 2420/403; G06V 20/586; G06V 10/44; G06V 10/242
See application file for complete search history.

(56) References Cited

U.S. PATENT DOCUMENTS

2017/0253236 A1\*  9/2017  Hayakawa ............. G08G 1/143
2018/0039264 A1    2/2018  Messner et al.
(Continued)

FOREIGN PATENT DOCUMENTS

DE    102013103569 A1 \* 10/2013  ......... B62D 15/0285
DE    102016220637 A1    4/2018
(Continued)

OTHER PUBLICATIONS

The International Search Report and the Written Opinion of the International Searching Authority mailed on Jul. 8, 2022 for the PCT Application No. PCT/DE2022/200062 which this application claims priority and DeepL translation of same.
(Continued)

*Primary Examiner* — Chico A Foxx
(74) *Attorney, Agent, or Firm* — Buchanan Ingersoll & Rooney PC

(57) ABSTRACT

A method for use of a detected parking space, including: a) detecting a potentially usable parking space by sensing a partial area of the parking space by a vehicle sensor system; b) determining an initial parking area contour and an initial parking area orientation for the detected parking space and determining a quality criterion therefor; c) altering the parking area orientation by rotating the initial parking area contour about a vertical axis, producing a contour with an altered rotational position; d) calculating a modified quality criterion based on the altered rotational position; e) checking whether the quality criterion for the parking space has improved; f) iteratively repeating c) to e) until reaching a termination criterion; g) specifying a final parking target (Continued)

area having a final parking area contour and orientation based on a highest quality criterion; h) manoeuvring so that the vehicle parks in the final parking target area.

14 Claims, 5 Drawing Sheets

(51) Int. Cl.
*G06V 10/44* (2022.01)
*G06V 20/58* (2022.01)

(56) References Cited

U.S. PATENT DOCUMENTS

| | | | |
|---|---|---|---|
| 2018/0334189 | A1 | 11/2018 | Benmimoun et al. |
| 2020/0166349 | A1* | 5/2020 | Ogata ................ G01C 21/005 |
| 2020/0393541 | A1 | 12/2020 | Schmid et al. |
| 2020/0398825 | A1* | 12/2020 | Tsujino ................ G06V 20/58 |
| 2021/0031755 | A1* | 2/2021 | Umino ............... B62D 15/0285 |
| 2021/0323538 | A1* | 10/2021 | Takahashi .............. G08G 1/143 |

FOREIGN PATENT DOCUMENTS

| | | | |
|---|---|---|---|
| DE | 102020126990 A1 * | 4/2021 | ........... G06V 20/586 |
| JP | 2013220745 A | 10/2013 | |
| JP | 2020-083140 A | 6/2020 | |
| JP | 2021-000958 A | 1/2021 | |

OTHER PUBLICATIONS

Notice of Reasons for Refusal mailed on Sep. 4, 2024 for the counterpart Japanese Patent Application No. 2023-559057 and machine translation of same.

Decision to Grant a Patent mailed on Dec. 25, 2024 for the counterpart Japanese Patent Application No. 2023-559057 and machine translation of same.

Office Action (Request for the Submission of an Opinion) issued Sep. 12, 2025, by the Korean Intellectual Property Office in corresponding Korean Patent Application No. 10-2023-7032774 and an English translation with the Concise Statement of Relevance of the Office Action. (19 pages).

\* cited by examiner

METHOD AND SYSTEM FOR OPTIMIZING A DETECTED PARKING SPACE

CROSS-REFERENCE TO RELATED APPLICATIONS

The present application is a National Stage Application under 35 U.S.C. § 371 of International Patent Application No. PCT/DE2022/200062 filed on Apr. 5, 2022, and claims priority from German Patent Application No. 10 2021 203 825.5 filed on Apr. 19, 2021, in the German Patent and Trademark Office, the disclosures of which are herein incorporated by reference in their entireties.

TECHNICAL FIELD

The invention relates to a method and a system for the improved use of a parking space detected by a parking assistance system and at least partially autonomously parked in.

BACKGROUND

Parking assistance systems are fundamentally known. To detect a parking space in a (partially) automatic parking assistance system, a parking spot or a possible parking space is scanned when driving past. Due to the limited range of the sensors and/or the speed of the vehicle (e.g. up to 50 km/h), the exact parking situation is often not correctly detected. In particular, often only the edge of the parking spot adjacent to the vehicle is detected, with the result that further bounding surrounding objects, such as further parked vehicles and boundaries or lines drawn on the ground are only detected with insufficient accuracy.

The initial detection of the parking spot is, for example, not exactly parallel or perpendicular to the optimum parking position of the vehicle in the parking spot or the vehicle does not scan the parking spot ideally at a right angle, with the result that it is not clear, during the initial determination of a parking area contour by the parking assistance system, how the parking area contour should actually be oriented in order to achieve an optimum parking result. This is particularly problematic when no imaging sensors such as cameras are used, which would allow an interpretation of information provided by other sensors (e.g. based on lines drawn on the ground).

In addition, adjoining objects such as vehicles that have also not been optimally parked can be at an angle to the actual parking space. If the parking area contour to be parked in is now calculated along the vehicle's own orientation, the vehicle is parked by the parking assistance system in such a way that it is not placed satisfactorily between the bounding objects, i.e., in particular in accordance with the normal parking position taken by the human driver.

The problem with the known parking assistance systems is that the parking spot is often not used optimally and parking processes are sometimes not initiated or are aborted because the parking spot is considered to be unparkable, even though a variation in the parking area orientation and/or the size of the parking area would make it possible to park.

SUMMARY

Based on this, it is the object of the present disclosure to specify a method for the improved use of a parking space detected by a parking assistance system, which method enables improved use of the existing parking spot and thus makes it possible to park the vehicle in a more natural manner which is modeled on the parking behavior of the human driver.

According to a first aspect, the present disclosure relates to a method for the improved use of a parking space detected by a parking assistance system. The method includes the following steps.

A potentially usable parking space is first of all detected by initially capturing at least one partial area of the parking space by means of a sensor system of a vehicle. Any sensor system of the vehicle can be used as the sensor system, for example ultrasonic sensors, radar sensors, cameras, LIDARs, etc. For example, during initial capture, only a partial area of the parking space adjacent to the vehicle is captured, but not the entire parking situation along the depth of the parking spot.

An initial parking area contour and an initial parking area orientation are then determined for the detected, potentially usable parking space. The initial parking area contour can be calculated, for example, from the information available through the initial capture of at least one partial area of the parking space. For example, the initial parking area contour may be a rectangular area, the size of which is at least partly derived from the initially captured information relating to the parking space and preferably partly also from the vehicle's own information, for example the length and/or width of the vehicle to be parked. Initial parking area orientation is understood to mean the rotational position of this parking area contour in the horizontal direction, where the rotational position can refer to a reference axis.

The parking area orientation is then changed by rotating the initial parking area contour or a parking area contour derived therefrom about a vertical axis. This creates a parking area contour with a changed rotational position. This means that, in the first iteration step, starting from the initial parking area orientation, the initial parking area contour is first of all rotated and, in the subsequent iteration steps, the process either starts with this initial parking area orientation again (for example if the first iteration step has resulted in an invalid parking space), or a modified parking area contour or a modified parking area orientation is used to further improve the parking space.

After changing the rotational position of the parking area contour, a modified quality criterion is calculated. A quality criterion is also already defined or calculated for the initially captured parking space, i.e., the initial parking area contour and the associated initial parking area orientation. The quality criterion can refer to a parameter of the parking space, for example the width of the parking area contour, the area of the parking area contour, the alignment of the parking area contour with other objects or a weighted combination of these parameters, etc. The modified quality criterion can be used to determine whether the usability of the parking space has changed due to the change in the rotational position of the parking area contour.

It is then checked whether the quality criterion for the parking space has improved. This can be carried out in particular by comparing the current value of the quality criterion with an initial value of the quality criterion or a value of the quality criterion from a previous iteration step.

The above steps of changing the parking area orientation, calculating a modified quality criterion and checking the improvement in the quality criterion are then iteratively repeated until an abort criterion has been reached. The abort criterion may be, for example, that the quality criterion no longer improves significantly, i.e., a maximum or essentially a maximum of the quality criterion has been reached. Alternatively, a threshold value can be specified as an abort criterion, with the result that the iterations are terminated if the quality criterion exceeds the threshold value.

A final parking target area with a final parking area contour and parking area orientation is then determined based on the highest quality criterion determined.

Finally, the parking process is carried out in such a way that the vehicle is parked in the final parking target area.

The technical advantage of the method is that advantageous parking in the parking space is achieved by the parking assistance system, specifically regardless of how the parking spot was initially scanned, i.e., even after the parking spot has been driven past at an angle, it is possible to park in it in a manner adapted to the human driving behavior. This makes it possible to additionally park in parking spots that would be rejected by conventional parking assistance systems.

According to one example embodiment, the parking area orientation is changed by a rotation in the clockwise and/or counterclockwise direction. For example, an attempt can initially be made to improve the use of the parking area by rotating in a first direction of rotation. For example, this first direction of rotation can be fixed or determined on the basis of available information about the parking situation or based on information about the surroundings that is provided by the vehicle's sensor system. The information may be, for example, the orientation of adjacent vehicles, the orientation of parking space markings, and/or the orientation of other objects.

According to one example embodiment, the parking area contour is first of all iteratively rotated in each case in a first direction of rotation and is rotated in the second direction of rotation after reaching an abort criterion. For example, the abort criterion may be that no improvement in the quality criterion was achieved in the last iteration step.

According to one example embodiment, the first direction of rotation is determined based on a parking situation derived when initially capturing at least one partial area of the parking space. This means that it is already possible to start with an advantageous direction of rotation, for which there is an expected improvement in the quality criterion. For example, the orientation of adjacent vehicles, the orientation of parking space markings, or other objects can be used to determine the first direction of rotation.

According to one example embodiment, the step width of the rotation of the parking area contour is changed. In particular, if an improvement in the quality criterion has been achieved in an iteration step, rotation can be continued with a greater step width in the same direction. However, if no improvement in the quality criterion has been achieved in an iteration step or the iteration step has led to an invalid parking space, the step width is reduced in the next iteration step. This means that optimum or essentially optimum use of the parking space can be achieved.

After carrying out an iteration step in which the quality criterion has improved, i.e., the usability of the parking space has improved, an iteration step is carried out in which the rotational position is not changed. This means that it can be seen whether the quality criterion has changed due to the rotation of the parking area contour or due to the detection of new objects that have been newly detected by the movement of the vehicle into the parking spot.

According to one example embodiment, after an iteration step, it is checked whether the parking area contour meets defined size criteria. This means that the parking space can be classified as valid, i.e., a size that allows parking is available.

According to one example embodiment, the size criteria indicate a lower limit and/or an upper limit for the length and width of the parking area contour. This makes it possible to check whether the vehicle to be parked can be parked in the parking spot at all, since the parking spot has a specified minimum size in the current rotational position of the parking area contour. Defining an upper limit for the length and width of the parking area contour may mean that arbitrarily large areas are not considered a parking space and parked in.

According to one example embodiment, at least in some iteration steps after the rotation of the parking area contour, it is checked whether the length and/or width of the parking area contour can be increased without a collision. If this is the case, the length and/or width of the parking area contour is/are increased in such a way that the result is an increased parking area contour that does not overlap surrounding objects.

According to one example embodiment, the parking area contour is increased in such a way that first an overlap with at least one surrounding object, with all adjacent surrounding objects, takes place and then the increased parking area contour is reduced until there is no longer any overlap with the detected surrounding objects. This makes it possible to extend the parking area contour with the advantage of the greatest possible parking area extent.

According to one example embodiment, the step of changing the parking area orientation by rotating the parking area contour about a vertical axis is carried out for the first time when the parking process has already been started by the parking assistance system and the vehicle has already been partially moved into the parking spot. This is advantageous if use is made of a sensor system that can capture the surrounding area of the vehicle only in a very narrow environment, for example up to 5 m. Starting the parking area optimization after the vehicle has been partially moved into the parking spot means that more information about the parking situation is already available than when initially determining the parking area contour and its rotational position. This means that the parking area contour and its rotational position can be adapted in an improved manner to parking situations that can only be detected when moving the vehicle into the parking spot.

If a sensor system is used to detect the parking situation, which sensor system can already capture the parking space at a sufficient depth before the start of the parking process, the step of changing the parking area orientation by rotating the parking area contour about a vertical axis can also already be carried out for the first time if the parking process has not yet been started by the parking assistance system and the vehicle has not yet been moved into the parking spot. This means that the parking process can already be started with an at least partially optimized parking area orientation.

According to one example embodiment, the vehicle surroundings are captured after initially capturing at least one partial area of the parking space during a vehicle movement, and updated information about the vehicle surroundings is created. The calculation of the modified quality criterion and/or check as to whether the parking area contour meets defined size criteria is/are carried out on the basis of this updated information. This allows the orientation and/or size of the parking area contour to be continuously adapted to the newly determined surrounding situation.

According to one example embodiment, the step of carrying out the parking process for placing the vehicle in the final parking target area includes maneuvering the vehicle. For example, it may be the case that the final parking target area cannot be occupied in the correct position in a parking movement, i.e., directly when driving into the parking spot. Instead, it may be necessary to perform a plurality of parking movements so that the vehicle occupies the final parking target area.

According to one example embodiment, information about the parking area contour, the parking area orientation and the associated quality criterion is stored at least partially in the iteration steps. In other words, in each of the iteration steps, a backup of information about the parking area contour, the parking area orientation and the associated quality criterion is generated. Only a backup of information from the last iteration steps or backups of information from a plurality of previous iteration steps can be stored. As a result, in a subsequent iteration step, if it is determined that this iteration step has not achieved a positive change in the quality criterion or that no valid parking space has been obtained, it is possible to resort to a backup of a previous iteration step.

According to a further aspect, the present disclosure relates to a parking assistance system for a vehicle for the improved use of a detected parking space, including at least one sensor system for capturing the vehicle surroundings and a computer unit. The computer unit is configured to perform the following steps:
 a) detecting a potentially usable parking space by initially capturing at least one partial area of the parking space by means of the sensor system of the vehicle;
 b) determining an initial parking area contour and an initial parking area orientation for the detected, potentially usable parking space and determining a quality criterion for the parking space;
 c) changing the parking area orientation by rotating the parking area contour about a vertical axis;
 d) calculating a modified quality criterion based on the changed rotational position of the parking area contour;
 e) checking whether the quality criterion for the parking space has improved;
 f) iteratively repeating steps c) to e) until an abort criterion has been reached;
 g) determining a final parking target area with a final parking area contour and parking area orientation based on the highest quality criterion determined;
 h) carrying out a parking process in such a way that the vehicle is parked in the final parking target area.

According to a final aspect, the present disclosure relates to a vehicle including a parking assistance system.

For the purposes of the present disclosure, the terms "approximately", "substantially" or "about" mean deviations from the respective exact value by +/−10%, preferably by +/−5%, and/or deviations in the form of changes insignificant for the function.

Developments, advantages and possible applications of the present disclosure also result from the following description of example embodiments and from the figures. In this case, all of the features described and/or illustrated in the figures are fundamentally the subject matter of the present disclosure, either in themselves or in any desired combination, irrespective of their combination in the claims or their back-reference. The content of the claims is also made part of the description.

BRIEF DESCRIPTION OF THE DRAWINGS

The invention will be explained in more detail below with reference to the figures using example embodiments. In the drawing.

DETAILED DESCRIPTION

Figure 1:
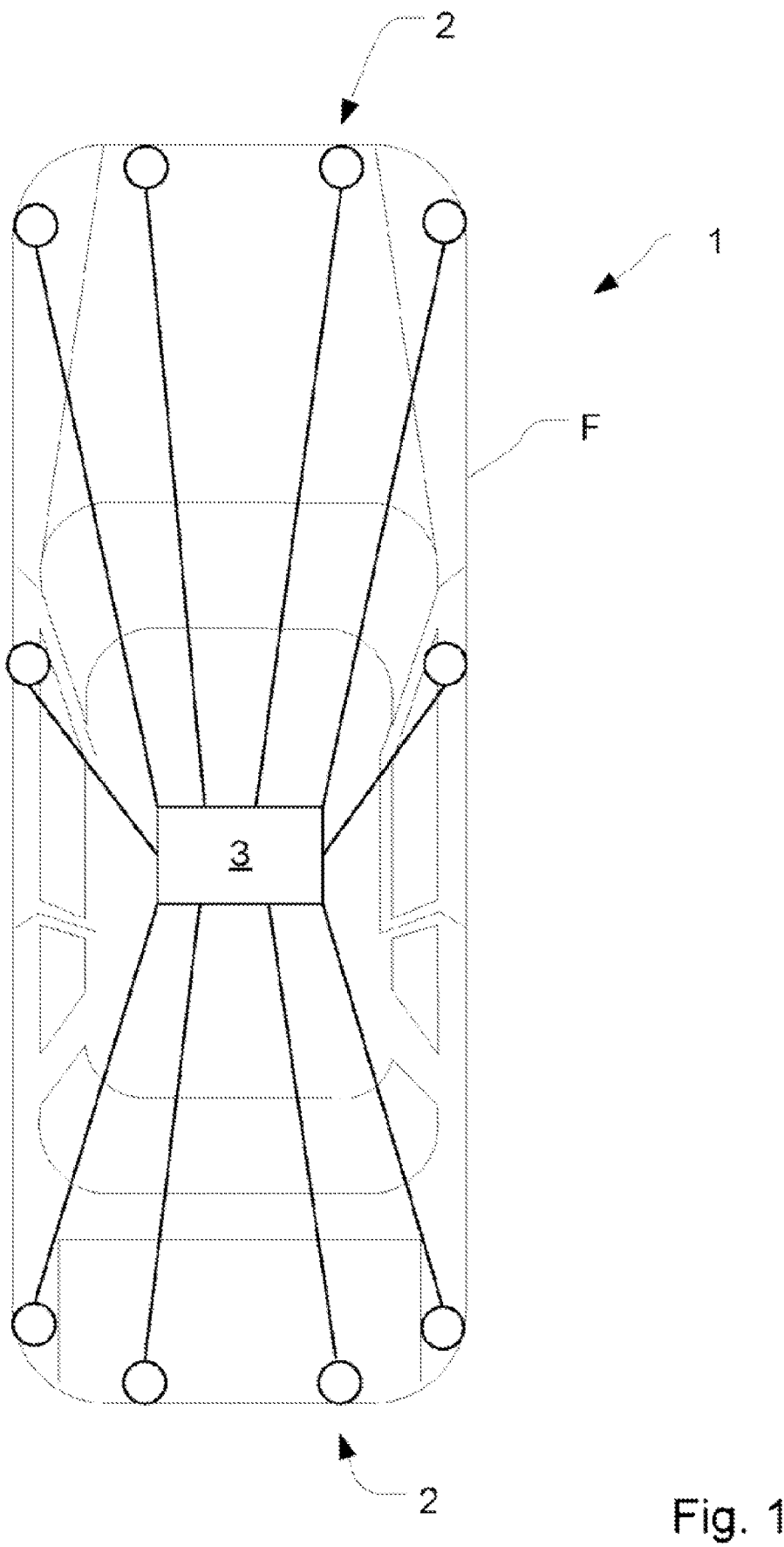
FIG. 1 shows, by way of example, a schematic illustration of a vehicle having a parking assistance system.

FIG. 1 shows, by way of example and in a roughly schematic manner, a vehicle F having a parking assistance system 1. The parking assistance system 1 includes a sensor system 2 with a multiplicity of individual sensors which are distributed around the vehicle F. The sensor system 2 may capture, for example, only a partial area of the surrounding area of the vehicle F or may be designed to capture the entire surrounding area of the vehicle F (360° capture). The sensor system may include any sensor types, such as ultrasonic sensors, one or more radar sensors, one or more cameras and/or one or more LIDAR sensors.

The sensor system 2 is coupled to a computer unit 3 which has at least one processor and at least one memory unit. This computer unit 3 is designed to carry out the method sequences disclosed in this document and thus achieve improved use of an available parking area.

Figure 2:
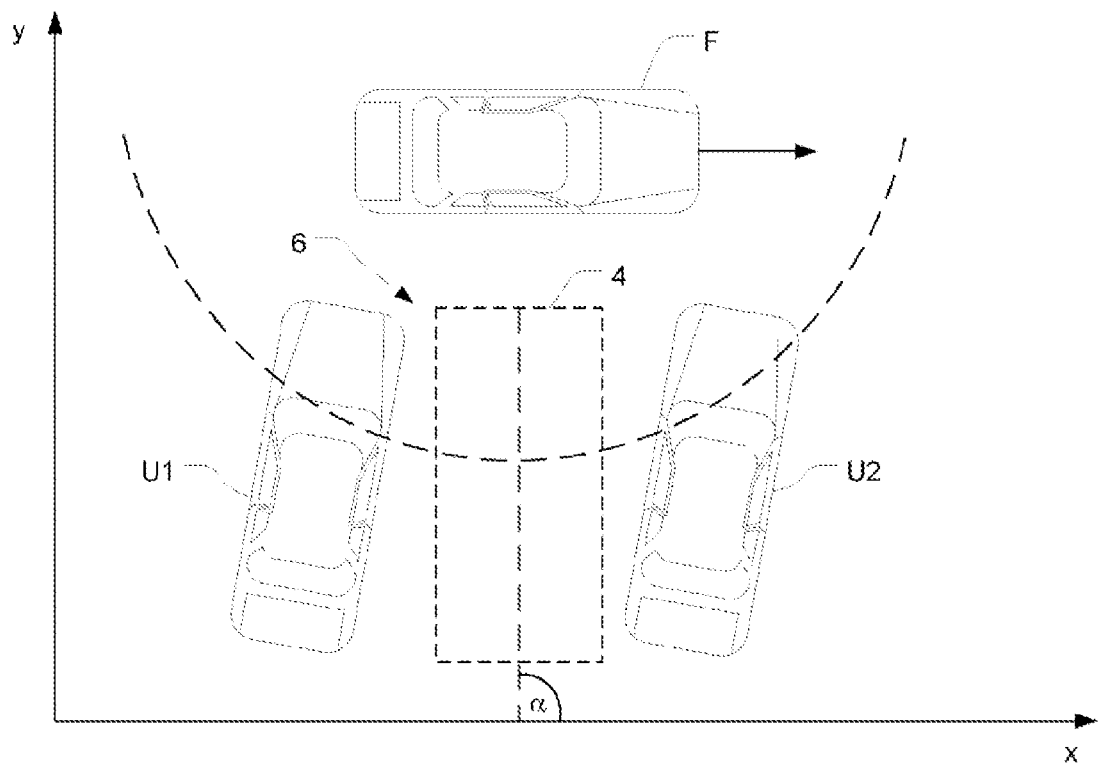
FIG. 2 shows, by way of example, a schematic illustration of a parking situation in which a vehicle drives past a parking spot and the parking spot is captured by a sensor system of the vehicle, wherein an initial parking area contour is determined.

FIG. 2 shows, by way of example, a perpendicular parking situation detected by the parking assistance system 1 of the vehicle F. In the Cartesian coordinate system shown, the vehicle drives laterally past the parking space in the positive x direction, as indicated by the arrow. In this case, the sensor system 2 of the parking assistance system 1 detects, as indicated by the dashed semicircle, the parking spot 6 which is formed between two objects U1, U2 in the example embodiment shown.

As shown in FIG. 2, the longitudinal direction of the parking spot does not extend perpendicular to the direction of travel of the vehicle F, but at an angle to it, i.e., it is neither a parallel nor a perpendicular parking situation, but an echelon parking situation lying between these two orientations.

As indicated by the dashed semicircle, the sensor system 2 often cannot capture the entire parking situation existing in reality, but only the opening of the parking spot facing the vehicle F can be detected, with the result that the actual orientation of the parking area of the parking spot or its actual size is not available when initiating the parking process.

Therefore, when initiating a parking process, often only information that indicates that the detected parking spot is a parallel parking space or a perpendicular parking space is available. Therefore, in the parking situation according to FIG. 2, it is initially assumed that the parking space has an initial parking area contour 4, as indicated in FIG. 2 by way of example by the dashed rectangle, i.e., the longitudinal axis of the parking spot extends perpendicular to the direction of travel of the vehicle when the parking spot is initially detected.

If the vehicle 4 carried out the parking process according to the original planning, the vehicle F would not come to a standstill in an echelon parking position similar to the orientation of the surrounding objects U1, U2 after completing the parking process, but, for example, with the longitudinal axis of the vehicle perpendicular to the original direction of travel.

Figure 3:
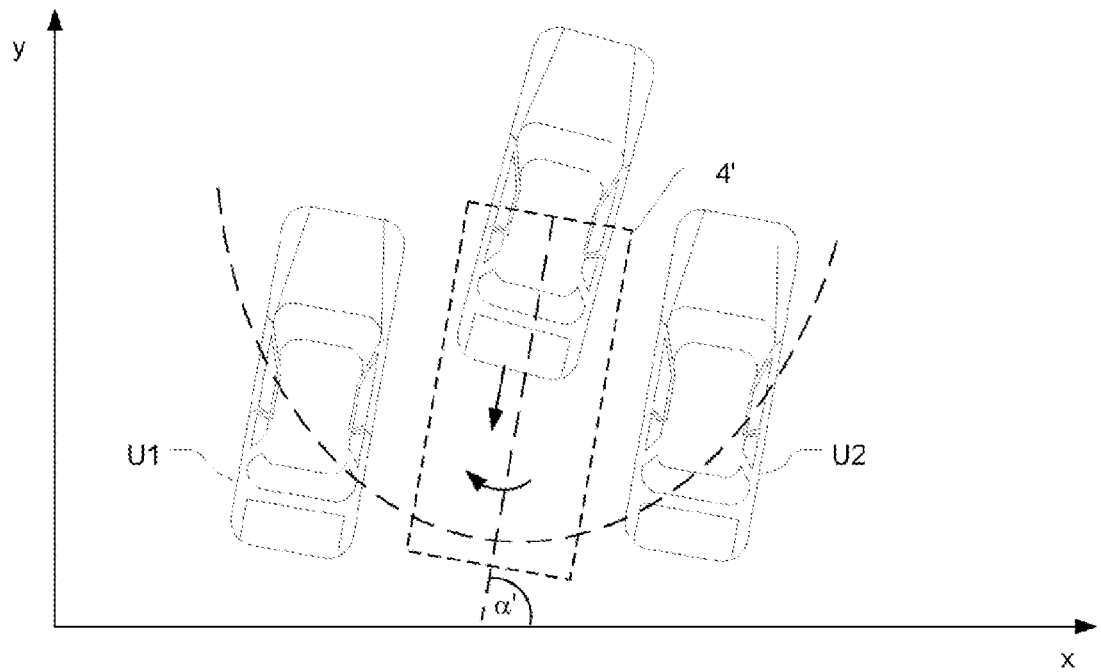
FIG. 3 shows, by way of example, a schematic illustration of a parking process in which a vehicle drives into the parking spot and the initial parking area contour is rotated in order to enable improved use of the parking spot.

FIG. 3 schematically shows an optimization step which is used to enable improved use of the initially detected parking space. In this case, the surrounding situation of the vehicle F is captured at least occasionally or continuously and, depending on the detected surrounding situation, the size and/or orientation of the initial parking area contour 4 is/are modified in its in such a way that, based on the detected surrounding situation of the vehicle F, improved use of the existing parking area results.

Starting with the initial parking area contour 4 and the initial parking area orientation α, a quality criterion which indicates a measure of the quality of the parking space is first of all calculated. The quality criterion may refer, for example, to the length of the parking space opening, over which the vehicle drives into the parking spot, or to the total area of the detected parking area.

Subsequently, as indicated in FIG. 3 by the curved arrow, the parking area orientation α is changed, specifically by rotating the initial parking area contour 4 about a vertical axis (about the z axis in the coordinate system shown). This results in a modified parking area contour 4' with a modified parking area orientation α', as shown in FIG. 3. The direction of rotation can be determined randomly or based on information about the parking space orientation derived from the detected information about the surroundings.

After changing the parking area orientation, a modified quality criterion is then calculated. This modified quality criterion differs from the original quality criterion due to the rotation of the parking area contour, i.e., the quality criterion may have improved or deteriorated.

It is then checked whether the quality criterion has improved or deteriorated. In the event of improvement, the method is continued based on this modified parking area contour 4'. If no improvement in the quality criterion has occurred, the results of the last iteration step are discarded and a backup of the last successful iteration step, the initial parking area contour 4 in the current example, is loaded in order to achieve improved parking area use based on this. For example, in a subsequent iteration step, the magnitude of the rotation angle by which the parking area contour is rotated can be reduced and/or the direction of rotation can be changed, i.e., an attempt is made to improve the parking area use by rotating the parking area contour in the opposite direction.

After carrying out an iteration step in which the quality criterion has improved, i.e., the usability of the parking space has improved, an iteration step is carried out in which the rotational position is not changed. This means that it can be seen whether the quality criterion has changed due to the rotation of the parking area contour or due to the detection of new objects that have been newly detected by the movement of the vehicle F into the parking spot. If the quality criterion changes without rotating the parking area contour, it can be concluded that the change in the quality criterion has occurred due to the changed detected surrounding situation.

Figure 4:
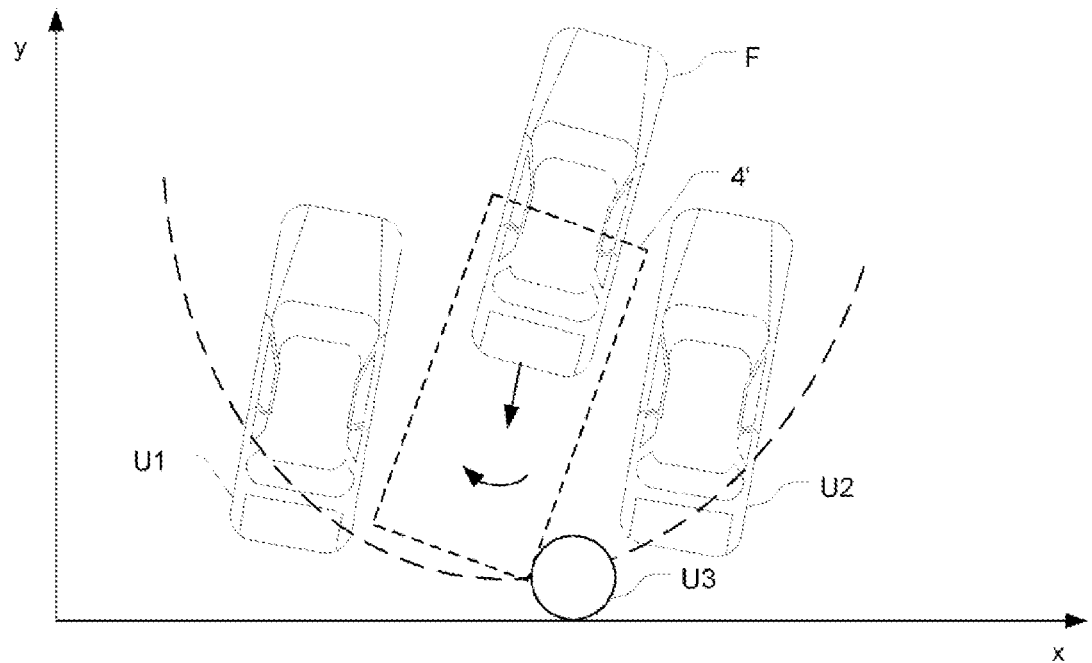
FIG. 4 shows, by way of example, a schematic illustration of a parking situation with a disturbing surrounding object, wherein it is made possible to park in the parking spot by rotating the parking area contour.

For example, FIG. 4 shows a surrounding scenario comparable to FIG. 3, but with the difference that a further surrounding object U3, which was not previously detected by the sensor system 2, was detected at the end of the parking spot. If the surroundings are now captured intermittently or continuously during the movement of the vehicle F, this further surrounding object U3 can also be detected and it can be determined in the iteration step, without changing the rotational position, whether the further surrounding object U3 influences the quality criterion. In other words, it can therefore be determined in the iteration step, without changing the rotational position, whether newly detected surrounding objects have led to a deterioration in the quality criterion and thus there is a changed parking situation which makes it necessary to newly adapt the parking area contour.

As can be seen in FIG. 4, a final parking target area 5, which allows the vehicle F to be parked in the parking area, can be determined by a further rotation of the parking area contour.

After changing the parking area orientation and/or the parking area contour, a checking step can be performed to determine whether the changed parking area orientation and/or the changed parking area contour results in a valid parking area. In this case, it is possible to check whether the parking area contour is collision-free toward the surrounding objects and also whether the length of the parking area contour has a specified minimum length and the width of the parking area contour has a specified minimum width. The minimum length and minimum width are vehicle-specific variables. In addition, it is also checked when checking a valid parking space whether the parking area contour does not exceed a specified maximum length or a specified maximum width. This may mean that free areas with an excessive length or width are not identified as parking areas and parking processes are not performed in them.

In addition, a checking step can be performed to check whether one side of a parking area contour is too long. This can be the case, for example, if a parking spot that is actually too wide has been scanned at an angle, with the result that the initial parking area contour is rotated/diagonal with respect to the actual parking spot. The initial parking area contour is then valid because its opening is shortened by the oblique position. If the optimization rotates the parking area contour into the correct position, the opening increases and now no longer complies with the maximum permissible width. The parking space is then discarded. The step prevents the detection of parking spaces that are too wide.

In addition to changing the parking area orientation, the size of the parking area contour can also be changed. In particular, the length and width of the parking area contour can be extended at least temporarily, in particular after each change in the parking area orientation α, in such a manner that the parking area contour fills the parking spot without a collision and preferably with a specified safety distance from the surrounding objects U1, U2, U3.

Figure 5:
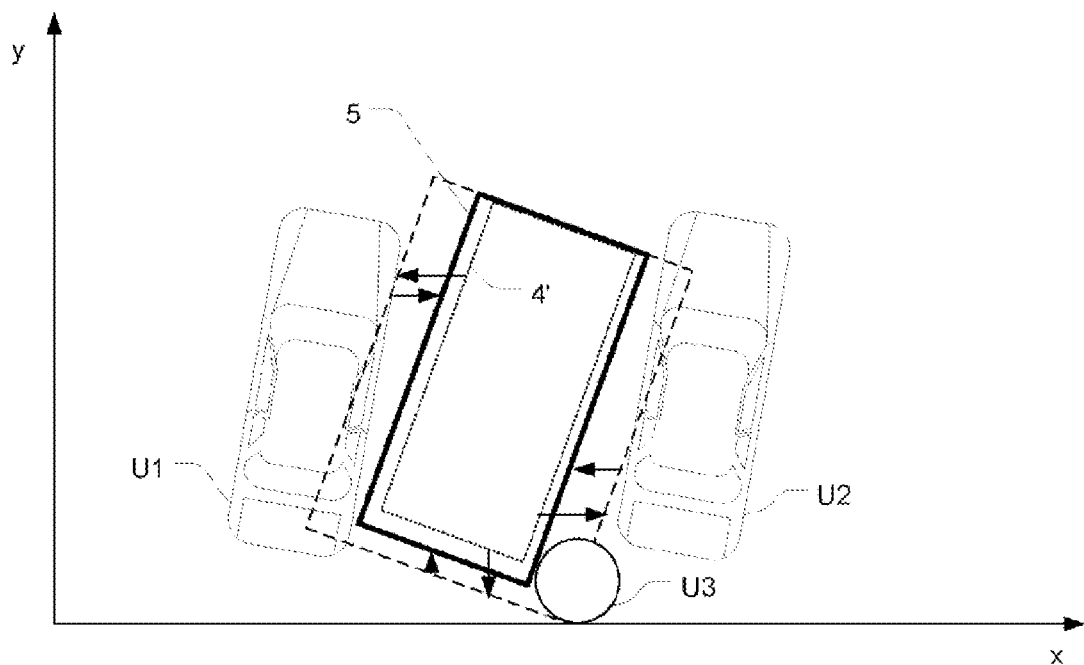
FIG. 5 shows, by way of example, a schematic illustration of a parking situation with a disturbing surrounding object, wherein improved usability of the parking spot is achieved both by rotating the parking area contour and by changing the size of the parking area contour.

FIG. 5 shows, by way of example and schematically, such a change in the size of the parking area contour.

The dotted line shows, by way of example, a parking area contour 4' which was obtained due to a change in the rotational position of a parking area contour in an iteration step of the method. After this change in the rotational position, it is checked whether the parking area contour can be increased. If this is the case, the parking area contour is extended, for example, by increasing the length and width of the parking area contour. This results in a modified parking area contour that is collision-free with respect to the surrounding objects U1, U2, U3, but uses the parking area in an improved way.

The length and width of the parking area contour can be increased, for example, in such a way that the extent of the parking area contour into the depth of the parking area (for example in a negative y direction according to the example embodiment in FIG. 5) is extended to such a degree that it has reached its maximum permissible extent in this direction. The maximum permissible extent can be a vehicle-specific value. In a perpendicular parking situation, the longitudinal direction of the parking area contour is increased up to a maximum vehicle-specific value, and, in a parallel parking situation, the transverse direction of the parking area contour is increased.

The parking space is then extended along a further spatial direction perpendicular to the spatial direction along which it was previously extended, for example the positive and negative x direction, in each case to such a degree that there is an overlap with surrounding objects U1, U2, U3, in particular all adjacent surrounding objects U1, U2, U3, which are located within a defined area. In particular, the extension can take place in such a way that there is an overlap with a defined distance.

In other words, after a rotation of the parking area contour, an attempt is made in each case to increase the area of the parking area contour, specifically in such a way that the parking area contour, which may form a rectangle, is extended in its longitudinal and/or transverse extent until an overlap with the surrounding objects has occurred. This extension of the parking area contour is indicated in FIG. 5 by the arrows directed outward.

The parking area contour may also be extended in directions in which there are no surrounding objects, but there are other lines or contours delimiting the parking area. Thus, for example, in a parking spot which is open to the street, the opening facing in the positive y direction in the example embodiment shown, there may be a marking which indicates the boundary of the parking area with respect to the street. This marking can be captured using a suitable sensor system, such as a camera, and taken into account when extending the parking area contour. This may mean that the final parking target area, and thus the vehicle in the final parked state, is arranged such that the parking target area or the parked vehicle comes to lie in a manner aligned with the adjacent surrounding objects U1, U2 on the left and/or right or lines delimiting the parking space.

After the parking area contour has been extended, all surrounding objects that overlap the extended parking area contour are captured. For example, the objects can be stored as two-dimensional polygon progressions.

The overlapping surrounding objects are successively processed in a list and the vector along which the parking area contour would have to be reduced in each case in order to be free of any overlap with the respective surrounding object is captured. This is indicated in FIG. 5 by the arrows directed inward. If there are a plurality of overlapping surrounding objects in one direction, the vector with the smallest magnitude is used first, i.e., the parking space is reduced along this vector. It should be ensured that the reduction vector is not pointing away from the vehicle F. This would mean that a part of the object would then be located between the vehicle F and the parking space. In the example embodiment shown, therefore, only those reduction vectors which have no negative y component are permitted.

After the parking area contour has been reduced by the smallest of the calculated vectors, the list of remaining overlapping surrounding objects is run through again and the necessary reduction vectors are calculated again. This is repeated until the parking area contour is free of any overlap with all objects.

The length and width of the parking area contour are also increased in the previously described iteration steps in which the parking area contour is not rotated, in order to also make it possible to increase the parking area contour when this does not become possible due to a rotation of the parking area contour, but rather by a movement of the vehicle into the parking spot.

The quality criterion of the modified parking area contour is determined whenever either the parking area contour has been rotated and the size of the parking area contour has subsequently been changed or only the size of the parking area contour has been changed.

Figure 6:
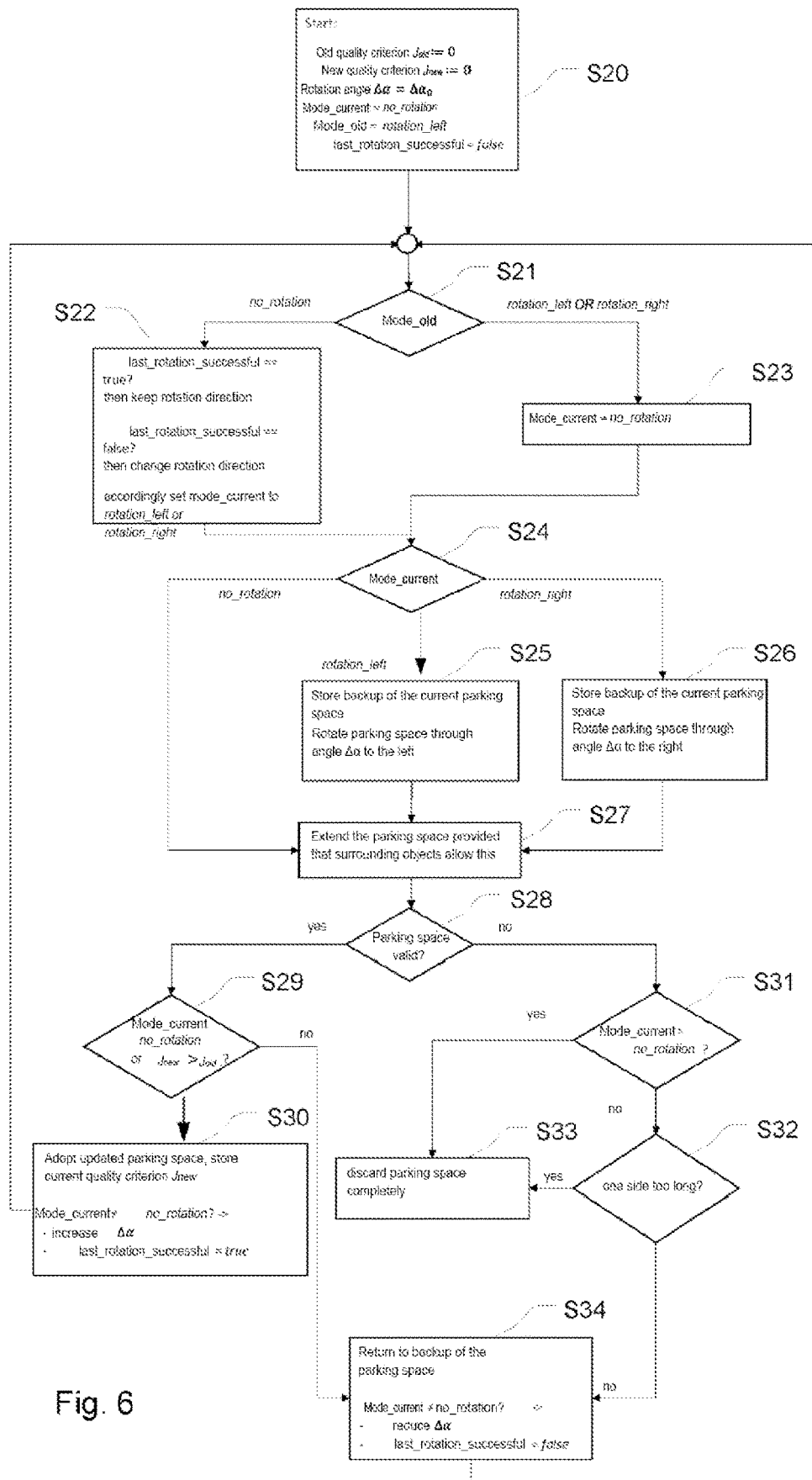
FIG. 6 shows, by way of example, a flowchart of an example embodiment of a method for the improved use of a parking space.

FIG. 6 shows a flowchart which illustrates an example implementation of the method described above.

At the beginning of the method, some variables are initialized in step S20; specifically, a variable $J_{old}$, in which a value of a quality criterion from the previous iteration step is stored, and a variable $J_{new}$, in which a value of a quality criterion from the current iteration step is stored, are initialized with the value 0. In addition, the step width of the rotation angle $\Delta\alpha$ is initialized with an initial value $\Delta\alpha_0$. In addition, a variable "mode_current" indicating the current mode is set to "no rotation". Other modes are "rotation_left" and "rotation_right." In addition, a variable "mode_old" indicating the mode in the previous iteration step is set to "rotation_left". Finally, a variable "last_rotation_successful," which indicates whether the rotation of the parking area contour, also referred to in the following and in FIG. 6 as "parking space," was successful in the previous iteration step, is set to "false."

The variable "mode_old" is then checked in step S21, i.e., which mode was used in the previous iteration step. In the first iteration step, the variable is set to "rotation_left" due to the initialization, i.e., step S23 is performed and the variable "mode_current" is thus set to "no rotation," i.e., the parking area contour is not rotated.

If it is determined in step S21 when checking the variable "mode_old" that it has the value "no_rotation," i.e., no rotation was performed in the previous iteration step, step S22 first of all checks whether or not the change in the parking area orientation in the penultimate iteration step was successful, i.e., whether or not the change in the parking area orientation in the penultimate iteration step resulted in an improvement in the quality criterion.

If this is the case, the rotation direction from the penultimate iteration step is retained, otherwise the rotation direction is changed by setting the variable "mode_current" to the appropriate value.

After determining the mode in the current iteration step, the value of the variable "mode_current" is then checked in step S24 and then, depending on the value of the variable "mode_current," either a rotation to the left, i.e., in the counterclockwise direction, to the right, i.e., in the clockwise direction, or no rotation is performed. If the variable "mode_current" has the value "rotation_left," step S25 first stores all the information necessary to restore the current parking area optimization state, in particular the current parking area orientation and the current parking area contour, for example its length and width or its local position. This information forms virtually a backup of the parking area optimization state which results from the previous iteration step and on the basis of which the parking area optimization state according to the previous iteration step can be restored if it turns out that that the current iteration step did not lead to an improvement in the quality criterion or an abort criterion of the method was reached. After the backup has been created, the parking area contour is rotated to the left, i.e., in the counterclockwise direction, by the angle $\Delta\alpha$.

In the other case, specifically that the variable "mode_current" has the value "rotation_right," step S26 again first stores all the information necessary to restore the current parking area optimization state, in particular the current parking area orientation and the current parking area contour, for example its length and width or its local position. This information forms virtually a backup of the parking area optimization state which results from the previous iteration step and on the basis of which the parking area optimization state according to the previous iteration step can be restored if it turns out that that the current iteration step did not lead to an improvement in the quality criterion or an abort criterion of the method was reached. After the backup has been created, the parking area contour is rotated to the right, i.e., in the clockwise direction, by the angle $\Delta\alpha$.

After the rotation of the parking area contour and the associated change in the parking area orientation $\alpha$, an attempt is made in step S27 to increase the parking area contour in such a way that the parking spot is filled in the best possible way, but there is no collision with the surrounding objects.

This step S27 is also performed immediately, i.e., without rotating the parking area contour, if the variable "mode_current" has the value "no_rotation," i.e., in this case, an attempt is made to increase the parking area contour directly without changing the parking area orientation $\alpha$.

After performing step S27 of increasing the parking area contour, step S28 checks whether the parking space is valid, i.e., whether the parking space has a required minimum length and minimum width. As previously already stated, it is also checked whether the parking space does not exceed a certain maximum length and/or maximum width.

If the check in step S28 reveals that the parking space is valid, step S29 checks whether a rotation was not performed previously, i.e., the value of the variable "mode_current" has the value "no_rotation" or whether the newly calculated quality criterion $J_{new}$ is greater than the old quality criterion $J_{old}$ from the previous iteration step.

If one of these criteria is met, the newly determined parking area contour and/or parking area orientation is adopted in step 30 and the newly determined quality criterion $J_{new}$ is stored as the quality criterion $J_{old}$.

If the variable "mode_currentt" does not have the value "no_rotation," i.e., the parking area orientation has just been changed, the variable $\Delta\alpha$, that defines the step width of the rotation angle is increased and the value of the variable "last_rotation_successful" is set to true.

The process then returns to step S21 and a new iteration step is performed.

If the check in step S29 reveals that neither the variable "mode_current" has the value "no_rotation" nor the newly calculated quality criterion $J_{new}$ is greater than the old quality criterion $J_{old}$ from the previous iteration step, step S34 is performed. The parking area optimization state according to the previous iteration step is restored (backup), with the result that the next iteration step can start again with this information or these values of the variables. It is then checked whether the variable "mode_current" has the value "no_rotation"; if this is the case, the variable $\Delta\alpha$ that defines the step width of the rotation angle is reduced and the value of the variable "last_rotation_successful" is set to false.

The process then also returns again to step S21 and a new iteration step is performed.

If the check in step S28 reveals that there is no valid parking space, step S31 checks whether the variable "mode_current" has the value "no_rotation." If this is the case, i.e., an invalid parking space arises in an iteration step in which the parking area orientation $\alpha$ has not been changed, the parking space is discarded in step S33 and the parking process of the parking assistance system is thus aborted.

If it is determined in step S31 that the variable "mode_current" does not have the value "no_rotation," i.e., the parking area orientation a has just been changed, step S32 additionally checks whether one side of the parking area contour is too long, i.e., exceeds a threshold value. This can be the case if a parking spot that is actually too wide has been scanned at an angle, with the result that the initial parking area contour is rotated/diagonal with respect to the actual parking spot. The initial parking area contour is then valid because its opening is shortened by the oblique position. If the optimization rotates the parking area contour into the correct position, the opening increases and now no longer complies with the maximum permissible width. The parking space is then discarded in step S28 in order to avoid detecting parking spaces that are too wide. In step S31, checking whether one side is too long determines whether the parking space should be discarded completely or whether the backup from the previous step can be used further.

If the check in step S34 reveals that one side is too long, the parking space is discarded again in step S33 and the parking process of the parking assistance system is thus aborted. Otherwise, i.e., if in an iteration step the parking area orientation $\alpha$ has been changed and no side of the parking area contour is too long, step S34 is performed again. The parking area optimization state according to the previous iteration step is restored (backup), with the result that the next iteration step can start again with this information or these values of the variables. It is then checked whether the variable "mode_current" has the value "no_rotation"; if this is the case, the variable $\Delta\alpha$ that defines the step width of the rotation angle is reduced and the value of the variable "last_rotation_successful" is set to false.

Once step S34 has been performed, the process also returns again to step S21 and a new iteration step is performed.

Figure 7:
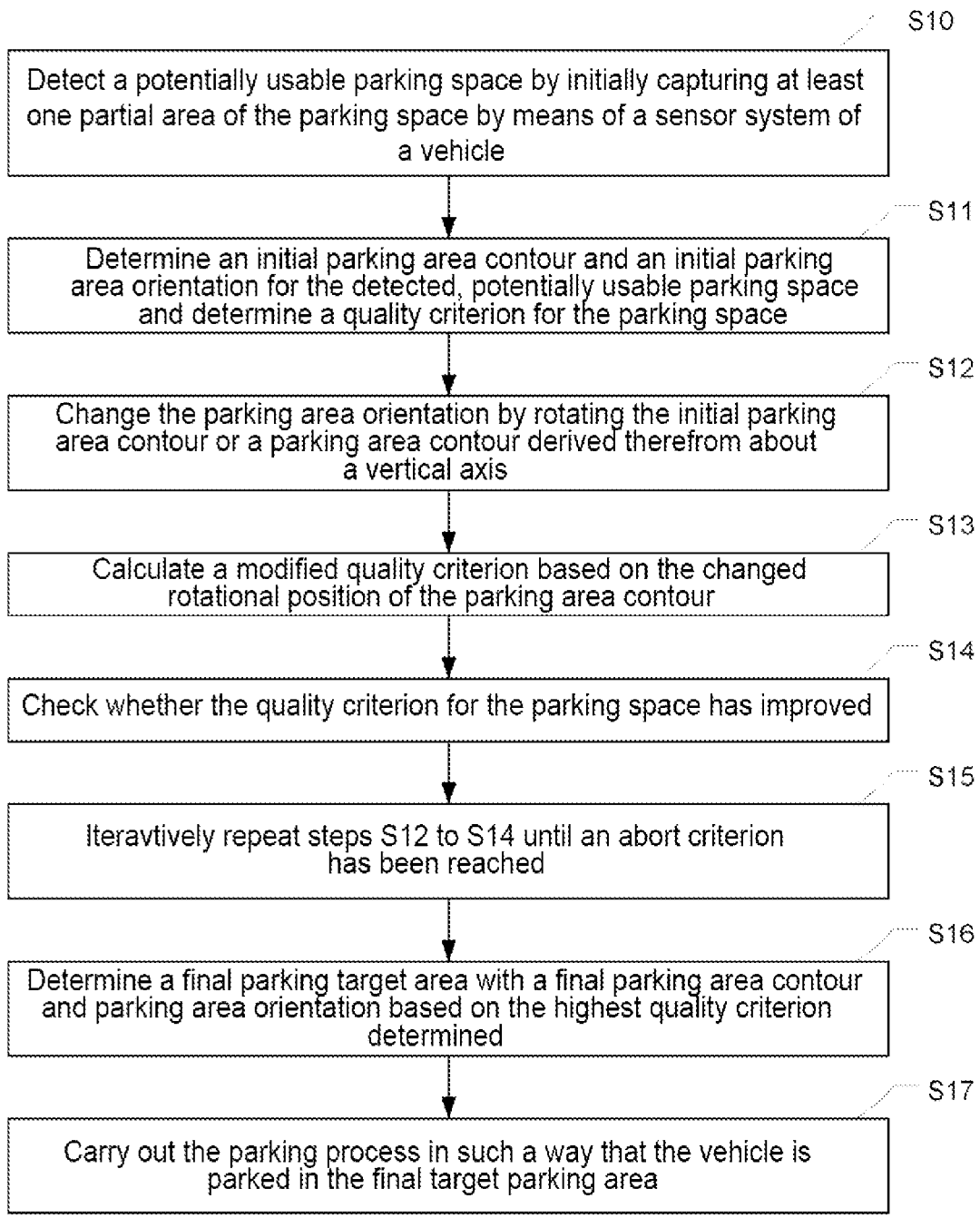
FIG. 7 shows, by way of example, a diagram illustrating the steps of a method for the improved use of a parking space.

FIG. 7 shows a diagram illustrating the method steps of the proposed method.

A potentially usable parking space is first of all detected by initially capturing at least one partial area of the parking space by means of a sensor system of a vehicle (S10).

An initial parking area contour and an initial parking area orientation are then determined for the detected, potentially usable parking space and a quality criterion for the parking space is determined (S11).

The parking area orientation is then changed by rotating the initial parking area contour or a parking area contour derived therefrom about a vertical axis (S12). This creates a parking area contour with a changed rotational position.

After changing the parking area orientation, a modified quality criterion is calculated based on the changed rotational position of the parking area contour (S13).

It is then checked whether the quality criterion for the parking space has improved, i.e., the modified quality criterion indicates that an improvement in the parking space has occurred (S14).

Steps S12 to S14 are then iteratively repeated until an abort criterion has been reached (S15).

A final parking target area with a final parking area contour and parking area orientation is then determined based on the highest quality criterion determined (S16).

Finally, the parking process is carried out by the parking assistance system in such a way that the vehicle is parked in the final parking target area (S17).

The present disclosure was described above using example embodiments. It is understood that numerous changes and modifications are possible without departing from the scope of protection defined by the patent claims.

LIST OF REFERENCE SIGNS

1 Parking assistance system
2 Sensor system
3 Computer unit
4 Initial parking area contour
4 Modified parking area contour
5 Final parking target area
6 Parking spot
F Vehicle
α Initial parking area orientation
α' Modified parking area orientation
U1, U2, U3 Surrounding object

The invention claimed is:

1. A method for the improved use of a parking space detected by a parking assistance system, comprising the following:
  a) detecting, by a computer comprising a processor, a potentially usable parking space by initially capturing at least one partial area of the parking space by means of a sensor system of a vehicle;
  b) determining, by the computer, an initial parking area contour and an initial parking area orientation for the detected, potentially usable parking space and determining a quality criterion for the parking space;
  c) changing, by the computer, the parking area orientation by rotating the initial parking area contour or a parking area contour derived therefrom about a vertical axis, resulting in a parking area contour with a changed rotational position;
  d) calculating, by the computer, a modified quality criterion based on the changed rotational position of the parking area contour;
  e) checking, by the computer, whether the quality criterion for the parking space has improved;
  f) iteratively repeating, by the computer, acts c) to e) until an abort criterion has been reached;
  g) determining, by the computer, a final parking target area with a final parking area contour and parking area orientation based on the highest quality criterion determined; and
  h) carrying out, by the computer, a parking process in such a way that the vehicle is parked in the final parking target area,
  wherein the parking area contour is first of all iteratively rotated in each case in a first direction of rotation and is rotated in a second direction of rotation after reaching an abort criterion.

2. The method as claimed in claim 1, wherein the parking area orientation is changed by rotation in at least one of a clockwise direction or counterclockwise direction.

3. The method as claimed in claim 1, wherein the first direction of rotation is determined based on a parking situation derived when initially capturing at least one partial area of the parking space.

4. The method as claimed in claim 1, wherein a step width of the rotation of the parking area contour is changed.

5. The method as claimed in claim 1, further comprising, after an iteration step, checking by the computer, whether the parking area contour meets a defined size criteria.

6. The method as claimed in claim 5, wherein the size criteria indicates at least one of a lower limit or an upper limit for a length and a width of the parking area contour.

7. A method for the improved use of a parking space detected by a parking assistance system, the method comprising:
  a) detecting, by a computer comprising a processor, a potentially usable parking space by initially capturing at least one partial area of the parking space by means of a sensor system of a vehicle;
  b) determining, by the computer, an initial parking area contour and an initial parking area orientation for the detected, potentially usable parking space and determining a quality criterion for the parking space;
  c) changing, by the computer, the parking area orientation by rotating the initial parking area contour or a parking area contour derived therefrom about a vertical axis, resulting in a parking area contour with a changed rotational position;
  d) calculating, by the computer, a modified quality criterion based on the changed rotational position of the parking area contour;
  e) checking, by the computer, whether the quality criterion for the parking space has improved;
  f) iteratively repeating, by the computer, acts c) to e) until an abort criterion has been reached:
  g) determining, by the computer, a final parking target area with a final parking area contour and parking area orientation based on the highest quality criterion determined; and
  h) carrying out, by the computer, a parking process in such a way that the vehicle is parked in the final parking target area,
  wherein, at least in some iterations after the rotation of the parking area contour, the method further comprises checking, by the computer, whether at least one of a length or a width of the parking area contour is increased without a collision and the at least one of the length or the width of the parking area contour is increased on the basis of a checking result in such a way that a result is an increased parking area contour that does not overlap surrounding objects.

8. The method as claimed in claim 7, wherein the parking area contour is increased in such a way that an overlap with at least one surrounding object first takes place and then the increased parking area contour is reduced until there is no overlap with the at least one surrounding object.

9. The method as claimed in claim 1, wherein changing the parking area orientation by rotating the parking area contour about a vertical axis is carried out for a first time when the parking process has already been started and the vehicle has already been partially moved into the parking spot, or the step of changing the parking area orientation by rotating the parking area contour about a vertical axis is carried out for a first time when the parking process has not yet been started, and changing the parking area orientation by rotating the parking area contour about a vertical axis is carried out after the parking process has been started.

10. The method as claimed in claim 1, wherein vehicle surroundings are captured during a vehicle movement after initially capturing at least one partial area of the parking space, and updated information about the vehicle surroundings is created on the basis of which a calculation of at least one of a modified quality criterion or the check as to whether the parking area contour meets defined size criteria is carried out.

11. The method as claimed in claim 1, wherein carrying out the parking process for placing the vehicle in the final parking target area comprises maneuvering the vehicle.

12. The method as claimed in claim 1, wherein information about the parking area contour, the parking area orientation and the quality criterion is stored at least partially in iteration operations.

13. A parking assistance system for a vehicle for the improved use of a detected parking space, comprising at least one sensor system for capturing vehicle surroundings and a computer unit comprising at least one processor, wherein the computer unit is configured to perform the following:

a) detecting a potentially usable parking space by initially capturing at least one partial area of the parking space by means of a sensor system of a vehicle;

b) determining an initial parking area contour and an initial parking area orientation for the detected, potentially usable parking space and determining a quality criterion for the parking space;

c) changing the parking area orientation by rotating the parking area contour about a vertical axis;

d) calculating a modified quality criterion based on the changed rotational position of the parking area contour;

e) checking whether the quality criterion for the parking space has improved;

f) iteratively repeating c) toe) until an abort criterion has been reached;

g) determining a final parking target area with a final parking area contour and parking area orientation based on a highest quality criterion determined; and h) carrying out a parking process in such a way that the vehicle is parked in a final parking target area,
wherein the parking area contour is first of all iteratively rotated in each case in a first direction of rotation and is rotated in a second direction of rotation after reaching an abort criterion.

14. A vehicle comprising a parking assistance system as claimed in claim 13.

* * * * *